United States Patent

[11] 3,562,483

| [72] | Inventor | William H. McMordie |
| | | Philadelphia, Pa. |
| [21] | Appl. No. | 749,489 |
| [22] | Filed | Aug. 1, 1968 |
| [45] | Patented | Feb. 9, 1971 |
| [73] | Assignee | The Budd Company |
| | | Philadelphia, Pa. |
| | | a corporation of Pennsylvania |

[54] EQUALIZING WELDING GUN AND TILTING SUPPORTING STRUCTURE
5 Claims, 4 Drawing Figs.

[52] U.S. Cl. .................................................. 219/89
[51] Int. Cl. .................................................. B23k 11/10
[50] Field of Search .................................. 219/89, 88, 78, 86

[56] References Cited
UNITED STATES PATENTS
3,008,034  11/1961  Wolfbauer ..................  219/89

*Primary Examiner*—J.V. Truhe
*Assistant Examiner*—J.G. Smith
*Attorneys*—Thomas I. Davenport, Edward M. Farrell, Jr., Alford L. Trueax and William R. Nolte

ABSTRACT: A welding gun and supporting structure having a plurality of cams and cam followers for controlling the movement of the welding gun between a welding position and a stored position and when in the welding position, freeing the welding tip for equalizing on the object to be welded during the welding cycle. The fluid pressure actuating cylinder for moving the electrodes and applying pressure during the welding cycle is also utilized as the power source for moving the welding gun and supporting structure between the stored position and the welding position.

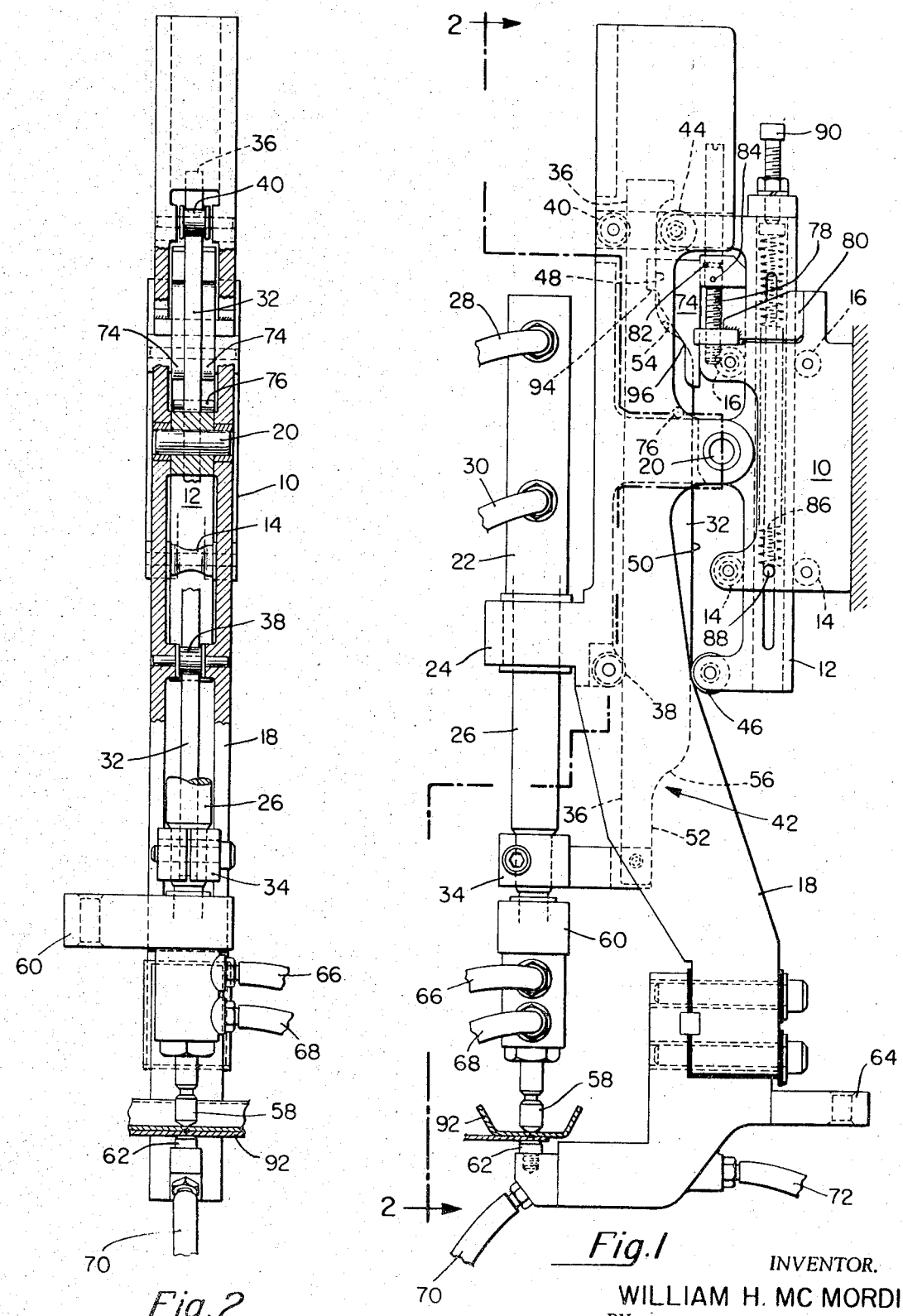

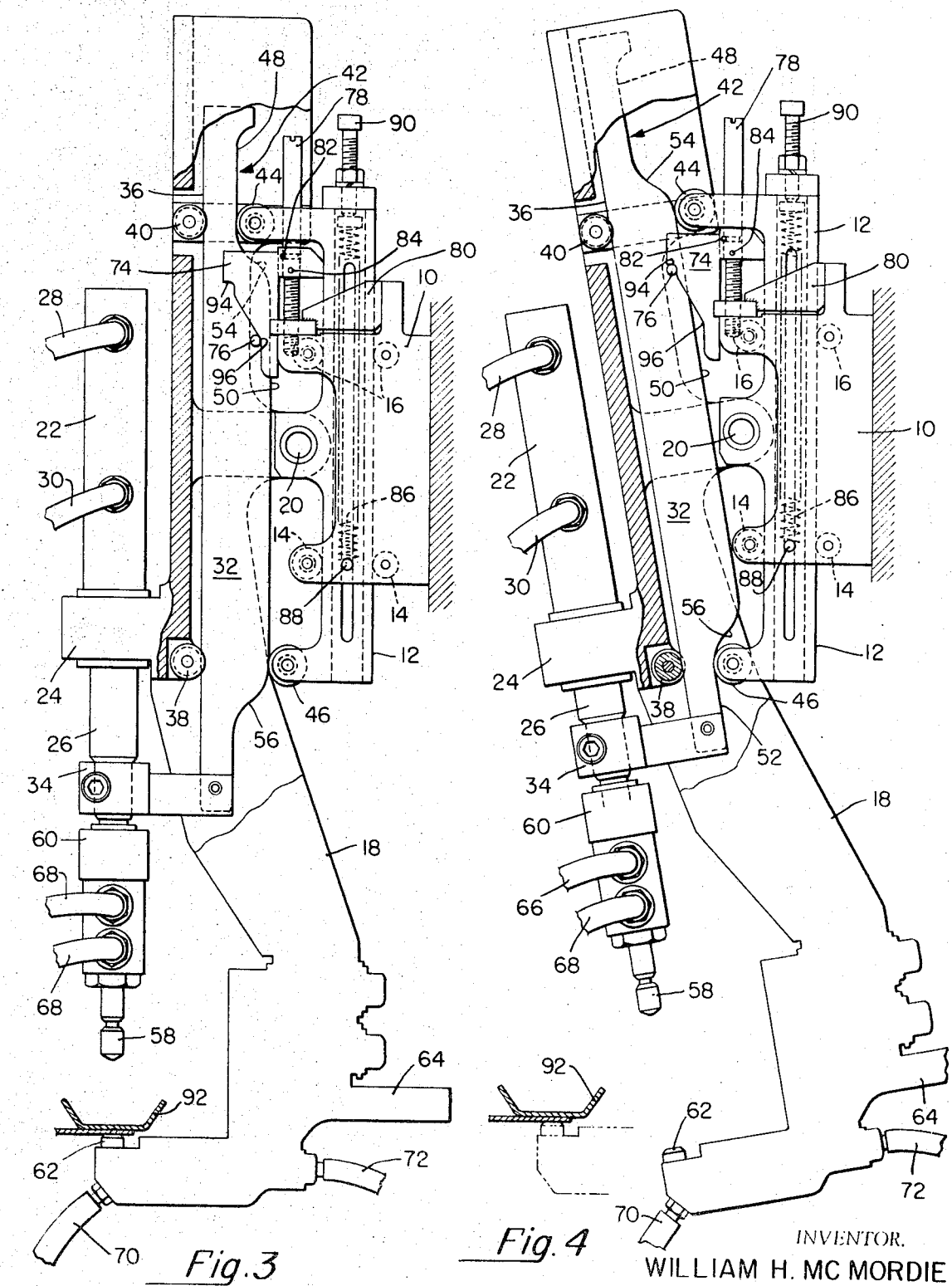

EQUALIZING WELDING GUN AND TILTING SUPPORTING STRUCTURE

This welding gun is a modification of copending application "Tilting Welding Gun," S.N. 601,958, filed Dec. 15, 1966.

This invention relates to hydraulically actuated spot welding guns and more particularly to a welding gun that utilizes a fluid pressure system for moving the welding gun that between a stored position and a welding position, and for applying pressure to the electrodes during the welding process. The improvement over the prior art comprises the unique feature of full equalization of the welding tips prior to and during the welding cycle so that the object to be welded will not be unduly damaged due to movement of one electrode toward the other fixed electrode. Positive control over the welding gun is required during movement between the stored position and the welding position, but once the electrode begins to approach opposite sides of the object to be welded, the ability of the welding head to move one electrode a greater distance than the other to accommodate the object to be welded becomes necessary to prevent damage to the welded object.

Another advantage of a full equalizing welding gun, is the ability of the gun to self-adjustment after tip dressing or because of tip wear. Thus, continuous readjustment of the weld stroke after wear of the electrodes or electrode tip dressing is not necessary.

An object of this invention is to provide a fluid pressure actuated welding gun in which the power cylinder for actuating the welding gun is used to supply the actuating force to sequentially move the welding gun from a stored or tilted position into a welding position by the aid of compatible cycloidal cams and conjugate cam followers, move the electrodes into contact with the object to be welded, permitting full equalization of the electrodes during the welding movements, and return the welding gun to the stored position after the welding cycle is completed.

Another object of this invention is to provide a second cam and cam follower for controlling the application of the biasing action of a balance spring until the welding gun is in the welding position.

These and other objects of this invention will become apparent as reference is made to the following specification and drawings wherein:

FIG. 1 is a side view of the welding gun of the present invention in welding position and illustrating the actuating cam, control linkages and control cam and control follower pin;

FIG. 2 is a front view of the welding gun with sections broken away to show the position of the control cam and control follower pin relative to the cam bar;

FIG. 3 is a side view of the novel welding gun in vertical position and the electrodes open, with sections broken away to illustrate the control cam, control follower pin and adjustment means of the control cam; and FIG. 4 is a side view of the novel welding gun in the stored or tilted position with section broken away to show the position of the control cam and control follower pin.

Referring now to the drawings, as best seen in FIG. 1 and 2, a mounting bracket 10 is secured to a fixed support such as a wall. A guide bar 12 is slidably mounted in the mounting bracket 10 with pairs of rollers 14, 16 rotatably secured in the mounting bracket and in contact with the guide bar 12 for providing easy movement of the guide bar relative to the mounting bracket.

The welding gun support frame or yoke 18 is pivotally secured to the guide bar 12 by a pivot pin 20 for pivotal movement relative to the guide bar 12 and mounting bracket 10.

A conventional double-acting fluid pressure-actuated drive cylinder 22 is secured to the yoke 18 by a clamp bracket 24 for movement therewith. A drive rod 26 extends from the drive cylinder 22 and is connected to a piston (not shown) within the drive cylinder for reciprocal movement therewith. A pair of fluid connections 28, 30 connect a source of fluid under pressure to opposite sides of the piston within the drive cylinder 22 for application of fluid under pressure to one of the sides of the piston upon command whereby the piston is moved within the cylinder and drives the drive rod 26 in reciprocal movements relative to the drive cylinder 22 in a conventional manner.

A cam bar 32 is secured to the drive rod 26 by clamp 34 for movement therewith. The cam bar 32 is positioned within the yoke 18, with one plane surface 36 contacting a pair of rollers 38, 40 journaled in the yoke, for reciprocating parallel movement relative to the yoke. A cam surface 42 is formed on cam bar 32 opposite surface 36 and is in contact with a pair of oscillating conjugate cam follower rollers 44, 46 journaled in the guide bar 12.

The cam surface 42 includes three surfaces 48, 50 and 52 that are parallel to each other and to surface 36. Surfaces 48 and 52 are in the same plane and equidistance from surface 36. Surface 50 is connected to surfaces 48 and 52 by conjugate cam ramps 54, 56, respectively. The cam ramps 54, 56 are formed as cycloidal cams of compatible but opposite slope and are positioned so that roller 46 will be contacting ramp 56 at all times that roller 44 is contacting ramp 54. Such cycloidal cam surfaces provide a sinusoidal acceleration curve for the cam system. Further, when roller 44 is in contact with surface 48, roller 46 will be in contact with surface 50 and when roller 46 is in contact with surface 52, roller 44 will be in contact with surface 50.

The welding gun consists of an upper electrode 58 connected to the drive rod 26 for movement therewith and having an arm 60 extend therefrom for connection to an electrical energy source. A lower electrode 62 is secured to the yoke for movement therewith and includes an arm 64 extending therefrom for connection to the source of electrical energy. Each electrode is water cooled in the conventional manner by water lines 66, 68 connected to the upper electrode 58 and water lines 70, 72 connected to the lower electrode 62. The electrodes 58, 62 are electrically insulated from the supporting structure by conventional means.

The novel feature of this tilting welding gun is the full equalizing feature of the electrodes during the welding cycle. The electrodes are freed for full equalization by a novel control cam 74 and control follower pin 76. The control cam 74 is vertically adjustable by an adjustment bolt 78 threadably positioned in a support arm 80 extending from mounting bracket 10. A roll pin 82 secures the control cam 74 on the adjustment bolt 78 for movement therewith. When the proper adjustment has been selected, the control cam 74 and adjustment bolt are secured from relative rotation by a cotter pin 84 or other suitable anchoring means.

The control follower pin 76 is secured in the cam bar 32 and positioned for contacting the control cam 74.

A balance spring 86 is located in the guide bar 12 and has one end bearing against pin 88 secured in the support bracket 10 and the other end bears against an adjustment bolt 90 threadably connected to the guide bar 12 for adjusting the effective force of the spring 86. In this manner the spring 86 resiliently supports the guide bar and yoke on support bracket 10 when control pin 76 is not in contact with control cam 74. The biasing force of spring 86 is adjusted by the adjustment bolt 90 for supporting the apparatus so that the lower electrode just contacts the workpiece 92.

In operation, with the welding gun in the stored position, as seen in FIG. 4, fluid pressure is supplied to the drive cylinder 22 through supply port 28 exerting a downward pressure on the piston and thereby moving the drive rod 26 away from the cylinder 22. The cam bar 32 moves with the drive rod on rollers 38, 40 contacting surface 36 and rollers 44, 46 moving over surfaces 50 and 52, respectively to the respective ramps 54, 56. As the roller 44 moves on ramp 54 from surface 52 to surface 50, the yoke 18 is pivoted about pivot pin 20 to a vertical position as seen in FIG. 3. During such movement of cam 32 and pivotal movement of the yoke 18, the cam follower pin 76 moves from contact with the stop 94 on control cam 74, as seen in FIG. 4, to the base of the cam stop 96, as seen in FIG. 3. Further downward movement of the drive rod 26 moves the upper electrode 58 toward the workpiece or object to be welded 92 as the rollers 44, 46 move on the respective surfaces 48, 50 of the cam bar 32. The downward movement of cam bar 32 causes the follower pin to leave the control cam surface and permits the biasing force of a balance spring 86 to resiliently support the apparatus on the pin 88 and to move the lower electrode 62 into contact with the workpiece 92. Continued application of fluid pressure through the port 28 causes the electrodes to equalize on the workpiece 92 and complete the welding cycle in a conventional manner.

After the welding operation, the fluid pressure applied through port 28 to the piston is topped and the fluid pressure is applied to the opposite side of the piston through port 30 causing the drive rod 12 and cam bar 32 to move upwardly. Moving the cam bar 32 upwardly moves roller 44 down surface 48 and up ramp 54 as roller 46 moves down surface 50 and down ramp 56 thereby tilting the apparatus to stored position as seen in FIG. 4. Such upward movement of the cam bar 32 moves the control follower pin 76 into contact with control cam 74 while rollers 44, 46 are on surfaces 48, 50 respectively. When control follower pin 76 is at the base 96 of the cam 74, as seen in FIG. 3, further upward movement of cam 32 is prevented until the fluid pressure overcomes the biasing action of spring 86 and causes the yoke 18 and guide bar 12 to move downwardly until the guide bar 12 contacts the upper portion of control cam 74, thus blocking further downward movement of the yoke 18 and guide bar 12. Continued application of fluid pressure to the piston will then move the welding gun to the tilted or stored position. The distance between the upper portion of the control cam 74 and the guide bar 12 is the vertical distance the lower electrode 62 moves to contact the workpiece. This distance may be controlled by the preloading of spring 86 by means of adjustment bolt 90.

Various degrees of tilt between the stored position and the welding position may be obtained by adjustment of the follower rollers and the cam ramps.

We claim:

1. A welding gun having a welding position and a stored position and being movable therebetween, said gun including mounting means for supporting said gun on a fixed support, a guide bar resiliently supported on roller means for rectilinear movement on said mounting means, a yoke movably supported on said guide bar for movement between said stored position and said welding position, actuating means operably connected to said yoke for moving said yoke between said positions, a first cam means operably interconnnecting said actuating means and said yoke for controlling movement of said yoke between said positions, a first welding electrode secured to said yoke for movement therewith, a second welding electrode secured to said first cam means and in alignment with said first electrode for movement theretoward by said actuating means, said second electrode being moved toward said first electrode during movement of said welding gun from said stored position to said welding position, a second cam means for restricting linear movement of said first electrode until said welding gun is in said welding position, a source of electrical energy operably connected to said electrodes, and control means for controlling said actuating means and electrical energy supplied to said electrodes for effectively welding a workpiece between said electrodes when said welding gun is in welding position.

2. The welding gun claimed in claim 1 wherein said second cam means includes a control cam secured to said mounting means and a control cam follower secured to said first cam means for movement therewith tin into and from with said control cam. A welding gun having a welding position and a stored position and being movable therebetween, said gun including mounting means for supporting said gun on a fixed support, a guide bar movably supported on said mounting means, a yoke movably supported on said guide bar for movement between said stored position and said welding position, actuating means operably connected to said yoke for moving said yoke between said positions, a first cam means operably interconnecting said actuating means and said yoke for controlling movement of said yoke between said positions, a first welding electrode secured to said yoke for movement therewith, a second welding electrode secured to said first cam means and in alignment with said for first electrode for movement theretoward by said actuating means, said second electrode being moved toward said first electrode during movement of said welding gun from said stored position to said welding position, a second cam means for restricting linear movement of said first electrode until said welding gun is in said welding position, said second cam means includes a control cam secured to said mounting means and a control cam follower secured to said first cam means for movement therewith into and from engagement with said control cam, a source of electrical energy operably connected to said electrodes, and control means for controlling said actuating means and electrical energy supplied to said electrodes for effectively welding a workpiece between said electrodes when said welding gun is in welding position.

3. The welding gun as claimed in claim 2 including a biasing means normally biasing said first electrode toward said second electrode and being effectively blocked from such biasing by said second cam means when said welding gun is moved from said welding position.

4. The welding gun as claimed in claim 3 wherein said control cam and said control cam follower cooperate to restrict linear movement of said electrodes until said welding gun is in said welding position, linear movement of said first electrode being restricted until said welding gun is in said welding position and said control cam follower reaches the base of said control cam and further movement of said first cam means moves said control cam follower from engagement with said control cam thereby freeing said first electrode for linear movement toward said second electrode and into engagement of a workpiece interposed between the electrodes.

5. The welding gun as claimed in claim 4 wherein linear movement of said second electrode is restricted when moving linearly from said first electrode by the engagement of said control cam follower with said control cam, said first electrode moves linearly away from said second electrode until said guide bar contacts said second cam means for blocking further linear movement of said first electrode and permitting said second electrode to be moved linearly from said first electrode as said welding gun is pivoted to stored position.